May 29, 1928. 1,671,607

E. F. PIERCE

FILTER

Original Filed Aug. 7, 1922

Inventor
Earl F. Pierce

Patented May 29, 1928.

1,671,607

UNITED STATES PATENT OFFICE.

EARL F. PIERCE, OF WINNETKA, ILLINOIS, ASSIGNOR TO THE BASSICK MANUFACTURING COMPANY, OF CHICAGO, ILLINOIS, A CORPORATION OF DELAWARE.

FILTER.

Original application filed August 7, 1922, Serial No. 580,052. Divided and this application filed October 8, 1925. Serial No. 61,160.

My invention relates to improvements in filters and is particularly concerned with improvements in filters to be used on automobiles, or other automotive vehicles, for filtering the gasoline, or other fuel, before it enters the vacuum tank or carburetor, etc.

The objects of my invention are:

First, to provide a filter, preferably of the visible type, comprising a cap, or supporting member, a filter element carried by the supporting member and a receptacle removably secured to the cap so that it can easily and quickly be removed;

Second, to provide a filter construction, such as described, in which the filter element is formed of chamois, fabric, or other flexible material, and which comprises means carried by the cap of the filter for holding the filter element in operative position;

Third, to provide a filter, such as described, from which the filter element can easily and quickly be removed and replaced with a new filter element;

Fourth, to provide a filter, such as described, in which spring means are used for holding the filtering element in its operative position;

And finally, to provide a filter, such as described, that is simple in construction and economical to manufacture.

Figure 2:
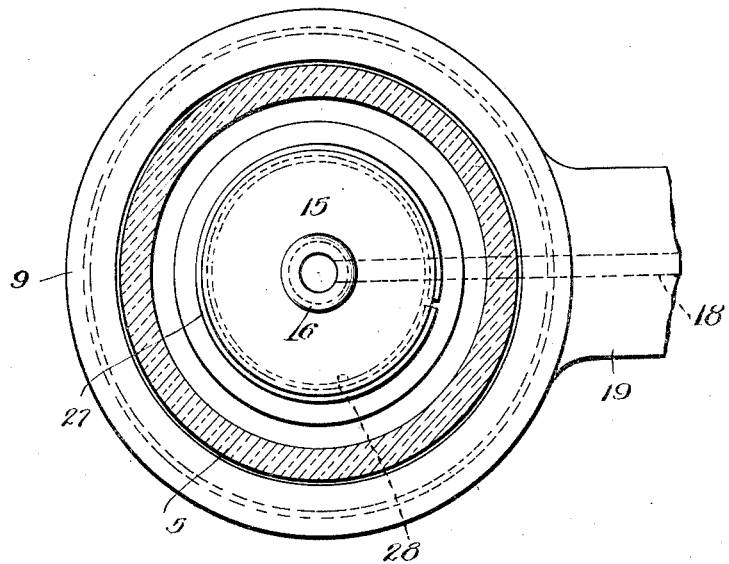
Figure 1:
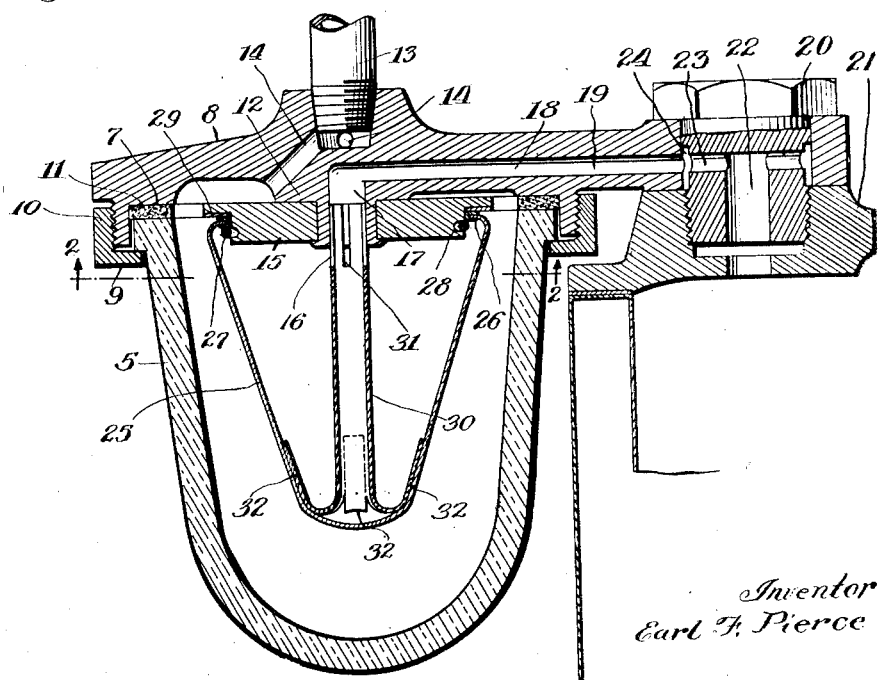

Other objects of my invention will appear as this description progresses, reference being had to the accompanying drawings, in which:

Figure 1 is a central, longitudinal section through one embodiment of my invention, showing it attached to a portion of a vacuum tank; and Figure 2 is a transverse section taken on line 2—2 of Figure 1.

Referring to the drawings, my improved filter comprises the receptacle 5 which is preferably formed of glass and which is more or less cup-shaped. The upper open end of the receptacle is provided with an outwardly extending flange 6 that is clamped between the shoulder 7, formed on the head 8, and the clamping ring 9. This clamping ring is preferably threaded onto the cap, or supporting member, as shown at 10, and to prevent leakage between the cap and receptacle I prefer to insert a cork, or other suitable gasket 11 between the shoulder 7 and the end of the receptacle.

The head 8 has an inwardly extending boss 12 that forms an annular fuel inlet communicating with the fuel inlet pipe 13 through suitable bores 14. The boss 12 comprises a disc-like enlargement 15 that may be integrally formed therewith but which is here shown as being separately formed and retained in place by swedging over the inwardly extending projection 16 formed integrally with the boss 12.

The boss 12 has formed therein a bore 17 that communicates with the passageway 18, formed in the cap, and the bracket member 19. This bracket member has an opening formed in its end for receiving the screw 20 by which the bracket is clamped to the cap 21 of a vacuum tank. The screw 20 is provided with a central bore 22, radial bores 23 communicating therewith, and an annular groove 24, all of which establish communication between the passageway 18 and the interior of the vacuum tank.

The filtering element comprises a bag 25 of chamois, or other suitable filtering material. The edge of this bag is confined in the ring 26 which is of U-shaped cross section and clamped to the edge of the filter bag. A split ring 27, loosely held in an annular groove 28 formed in the disc 15, is adapted to be forced into the groove to permit the ring 26 to be positioned as shown and then designed to spring outwardly to support the filter element in the position shown in Figure 1. If desired, a cork or other suitable gasket 29 may be confined between the ring 26 and the disc to prevent leakage.

For holding the filter element in distended relation, and in proper position to operate, I provide a tubular member 30, one end of which is slotted, as shown at 31, to form spring tongues. By inserting these spring tongues into the opening 17, the tubular member 30 can be rigidly held in place. The other end of this member is likewise slotted, or slitted, to form spring tongues 32 that are first bent outwardly and then backwardly to provide tension members for engaging the filter element 25 and holding it in proper distended shape.

In the operation of my improved filter the fuel enters through the pipe 13, the bores 14 and the annular space surrounding the boss 12, passes around the edges of the disc 15 and into the receptacle 5. The fuel then passes through the filter element and into the passageway 17, either through the bottom of the slots 31 or through the bottom of the tube 30, and then into the pipe 17 and from thence through the passageway 18 into the fuel tank.

In the course of time the lower portion of the receptacle 5 will become filled with water, dirt, sediment, etc., which can be readily removed simply by unscrewing the clamping ring 9 and removing the receptacle so that its contents can be emptied. If desired, the filter element 25 can be easily removed and replaced by a new one.

This application is a division of my co-pending application Serial No. 580,052, filed Aug. 7, 1922.

While I have described the details of construction of the preferred embodiment of my invention, it is to be understood that my invention is not limited to these details but is capable of other adaptations and modifications within the scope of the appended claims.

Having thus described my invention, what I claim is:

1. A filter comprising a receptacle, a cap having an inwardly extending boss provided with an opening, a filter element in said receptacle, and means for securing said filter element to said cap comprising spring means that tends to expand radially and force said filter element toward said cap, and a member extending longitudinally of said filter element and having one end inserted in said opening.

2. A filter comprising a receptacle, a cap provided with an opening, a filter element in said receptacle, and means for securing said filter element to said cap comprising a split spring tending to force said filter element toward said cap, and a member extending longitudinally of said filter element having one end inserted in said opening, and having means at its other end to shape the filter element.

3. A filter comprising a receptacle, a cap having an inwardly extending boss provided with an opening, a disc secured to said boss, a filter element in said receptacle and having its upper end surrounding said disc, and a ring-shaped expansible spring adapted to force said filter element upwardly toward said cap.

4. A filter comprising a receptacle, a cap therefor having an inwardly extending boss provided with an opening, a peripherally grooved disc secured to said boss, a filter element fitting over said disc, and a split ring spring held in the groove of said disc and adapted to yieldingly press said filter element against said disc.

In witness whereof I hereunto subscribe my name this 23d day of September, 1925.

EARL F. PIERCE.